United States Patent [19]

Snavely

[11] 4,139,666

[45] Feb. 13, 1979

[54] ANTITACK AGENT

[75] Inventor: Kenneth E. Snavely, Bartlesville, Okla.

[73] Assignee: Phillips Petroleum Company, Bartlesville, Okla.

[21] Appl. No.: 657,823

[22] Filed: Feb. 13, 1976

[51] Int. Cl.$^2$ .................. F16L 11/04; B32B 25/04
[52] U.S. Cl. .................................. 428/36; 119/14.02; 138/126; 138/145; 138/146; 252/381; 252/384; 427/28; 427/181; 427/230; 426/289; 426/132; 428/341; 428/492; 428/474; 428/521; 428/522; 428/532
[58] Field of Search ............... 428/36, 341, 492, 522, 428/474, 532, 498, 521, 507; 426/289, 132; 427/181, 230, 28; 138/126, 145, 146; 252/381, 384; 119/14.02

[56] References Cited

U.S. PATENT DOCUMENTS

| | | | |
|---|---|---|---|
| 2,673,844 | 3/1954 | Gilcrease | 428/492 |
| 3,122,482 | 2/1964 | Smith | 252/381 |
| 3,474,755 | 10/1969 | Voo | 427/181 |
| 3,662,054 | 5/1972 | Wollmann | 427/230 |
| 3,881,023 | 4/1975 | Wilson | 426/132 |
| 3,940,497 | 2/1976 | Arenson | 426/289 |

FOREIGN PATENT DOCUMENTS

| | | | |
|---|---|---|---|
| 862042 | 1/1971 | Canada | 426/132 |
| 439322 | 1936 | United Kingdom | 427/230 |

*Primary Examiner*—Ellis P. Robinson

[57] ABSTRACT

Powdered milk is used as an antitack agent for products made to handle food items, particularly milk. In one embodiment, flexible articles used for handling and storage of food items such as milk are coated with sufficient powdered milk to prevent sticking upon contact. In a preferred embodiment, powdered milk is used as a noncontaminating antitack agent to treat the interior surfaces of rubber tubing designed for use in the transport of milk.

14 Claims, No Drawings

ANTITACK AGENT

This invention relates to the treatment of articles of manufacture used for handling and storage of food items with antitack agents. In accordance with another aspect, this invention relates to the treatment of the surfaces of products made to handle and store food items with powdered milk as an antitack agent. In accordance with another aspect, this invention relates to treating the surfaces of flexible items designed for use in the handling of food items such as milk with powdered milk as an antitack agent which will be noncontaminating to the particular food being handled. In accordance with another aspect, this invention relates to the use of powdered milk as an antitack agent to treat the interior surfaces of rubber tubing designed for use in the transport of milk.

Rubber tubing, which is commonly used for transporting milk and which contains compounding ingredients generally regarded as safe for contact with foodstuffs, is often closed to prevent flow of milk by applying a clamp which flattens or constricts the tubing, thus forcing contact between the interior surfaces of the tubing. Another common method of closure of such tubing is the bending of the tubing at a sufficiently sharp angle to constrict or force contact of the interior surfaces of the tubing and thus prevent the flow of milk. Frequently the rubber compounds employed in milk tubing have enough inherent tackiness or stickiness that when flow of milk is desired and the above-described clamp is released or the bent tubing is straightened, the interior surfaces of the tubing do not release immediately but remain constricted or in contact for a period of time, thus preventing flow of milk. Subsequently hydrostatic pressure of the milk on the constriction or the elastic memory of the rubber can force open the tubing and allow flow of the milk. The unpredictability and inconvenience of the period of time required for milk to begin flowing through the tube after the clamp is opened or the bent tube is straightened renders such tubing quite unattractive for use in milk transport.

A number of antitack agents are known in the rubber art which render compounded rubber less tacky or sticky. Such agents include talc, silica, clay, etc. The use of many such agents in milk tubing is, however, prevented by some of their characteristics, including toxicity, incompatibility with milk, etc. Even such agents which lack these undesirable characteristics, when washed from the walls of the tubing by the milk, simply become contaminants in the milk.

Accordingly, an object of this invention is to provide novel antitack agents for products made to handle food items.

Another object of this invention is to provide antitack agents that will not contaminate food items coming in contact with the agents.

Another object of this invention is to provide antitack agents for articles of manufacture designed to handle and store food items such as milk.

Other objects and aspects, as well as the several advantages of the invention, will be apparent to those skilled in the art upon a study of this disclosure and the appended claims.

Broadly, according to the invention, powdered milk is used as a noncontaminating antitack agent for products made to handle and store food items.

More specifically, powdered milk is used as an antitack agent to coat flexible articles of manufacture designed for use in handling and storage of food items such as milk.

More specifically, and in the preferred embodiment, powdered milk is used as an antitack agent to coat the interior surfaces of rubber tubing used to handle and transport milk.

Thus, in a preferred embodiment of the invention, this invention pertains to the use of powdered milk solids as a noncontaminating antitack agent on the interior surfaces of tubing designed for use in the transport of milk. It will be recognized that any of the powdered milk solids washed from the tubing walls by the milk will readily disperse in the milk and become indistinguishable from the milk in which it is dispersed.

The powdered milk solids employed in this invention can be prepared by any of the methods well known in the art for removing the water from milk to produce a free-flowing, readily dispersible powder. The milk employed in the production of said solids can be whole milk, low-fat milk (approximately 2 weight percent butterfat) or fat-free (skim) milk. A number of types of powdered milk solids are well known in the art, and many are commercially available.

Any rubber which, along with corresponding compounding ingredients, is suitable for contacting with foodstuffs can be employed in the tubing which is treated with the antitack agent of this invention. Suitable rubbers include both natural and synthetic rubbers. Vulcanized as well as unvulcanized rubbers which can be formed into useful tubes are within the scope of this invention. Of the synthetic rubbers, those especially preferred are the linear and radial teleblock copolymers of monovinyl aromatics and conjugated dienes well known in the art which possess the property of high green tensile strength and elongation in the unvulcanized state. Such copolymers are commonly referred to as thermoplastic elastomers and are commonly represented by the formulas:

$$A—B—A \qquad \qquad \text{I.}$$

and $$(AB)_x Y \qquad \qquad \text{II.}$$

wherein A represents a block of polymerized monovinyl-substituted aromatic compound, B represents a block of polymerized acyclic conjugated diene compound, Y represents a moiety of a coupling agent residue, and x is an integer having a value of from 2 to 4. The A block is preferably a block of polymerized styrene and the B block is preferably polymerized butadiene or isoprene. Y is preferably the residue of a polyfunctional coupling agent such as silicon tetrachloride and x is preferably 3 or 4. The conjugated diene compounds normally employed will have from 4 to 12 carbon atoms per molecule.

Block copolymers of formulas I and II are readily prepared by methods well known in the art such as in U.S. Pat. Nos. 3,281,383, 3,251,905, and 3,639,521.

The above-described rubbers can be compounded with any desired compounding ingredients which are well known in the art with the proviso that the finished tubing be suitable for contact with foodstuffs. Such compounding ingredients include vulcanizing agents, vulcanization accelerators, fillers, extenders, plasticizers, stabilizers, etc.

The tubing employed in this invention can be prepared by any means well known in the art. It is currently convenient to employ an extruder with a die at the outlet which is capable of extruding the compounded rubber into a continuous tube of desired diameter and wall thickness. The extruded tube is then vulcanized, if desired, or in the case of the preferred thermoplastic elastomers of this invention, the extruded tube is cooled to ambient conditions after which it possesses the high tensile strength and elongation desired in rubber tubing.

The powdered milk solids can be applied to interior surfaces in any desired and suitable fashion. It may be desirable to pour, blow, brush, etc., the powder into short pieces of tubing just prior to its attachment to suitable milk dispensers, containers, etc. It may also be desirable to pour or blow the powder into the tubing after it has been extruded and coiled on rolls. It may also be desirable to apply the powder to the interior of the tube during the extrusion process by a device positioned near the outlet of the extruder which is capable of applying the powdered milk solids to the interior of a continuously formed tube.

The powdered milk solids are applied to the interior of the tubing in any amount which will provide the desired result. It is desirable to apply sufficient powder to the interior surface of the tube to provide a uniform coating. It is likewise desirable to apply no more than that amount which will readily adhere to the interior surface. Thus, it will be recognized by one skilled in the art that the amount of powdered milk solids applied to the interior surface of the rubber tubing will be dependent upon the tackiness of the rubber tube which is dependent on the specific rubber and the various compounding ingredients employed. The amount of powdered milk solids employed in this invention will generally be in the range of 1 mg to about 10 kg per square meter of surface area.

It is currently convenient to apply the powdered milk solids to the tubing interior by pouring an excess of powdered milk into a short length of tubing, agitating the tube, and pouring out the excess powdered milk leaving the interior surface of the tubing coated with that amount of powdered milk solids which readily adheres to the tubing.

It is anticipated that some or all of the powdered milk solids may be washed out of the tubing during the initial and subsequent flowing of milk through the tubing. The milk left in contact with the tubing surface after subsequent closure of the tubing by any of the above-described methods may leave a milk residue which can further function as an antitack agent after part or all of the original powdered milk solids have been washed from the tubing.

So far as is presently known, the greatest utility of the invention is in connection with rubber tubing coated on the interior surfaces with powdered milk as an antitack agent for handling of milk and similar products. However, the utility of the invention is not limited to rubber tubing since the principles of the invention are also usable with other flexible items which are used for handling or storage of food items in which the flexible material normally has a tendency to stick when in contact with another portion of the flexible item or some other item. Thus, the principles of the invention are also applicable to other products adapted for handling, as well as containing, food items. However, for convenience, the invention has been described largely in connection with the coating of the interior surfaces of rubber tubing used for handling milk coated with powdered milk as an antitack agent.

EXAMPLE

The following inventive runs 1 and 3 illustrate the use of powdered milk solids as an antitack agent in rubber tubing formulated for use in the transport of milk. The accompanying comparative runs 2 and 4 are provided to show the advantage accruing from this invention.

A commercial 60/40 butadiene-styrene radial block copolymer extended with 50 parts by weight per 100 parts of rubber (phr) of naphthenic oil was compounded according to one of the following recipes and extruded into tubing (16 mm outside diameter, 13 mm inside diameter). In inventive runs 1 and 3 a commercial nonfat powdered milk solids (Carnation brand) was poured through 5 cm sections of the tubing to provide a uniform coating on the interior surfaces of the tubing. In comparative runs 2 and 4 the tubing sections were not so treated. Screw clamps were applied to the sections of tubing and tightened to flatten the tubing in contact with the clamp and force contact of the interior surfaces of the tubing. The clamps were left in place for the time periods specified in Table I and then removed. The time required for the interior surface of the tubing to release and return to the original dimensions was recorded.

| Recipe (phr) | A | B |
|---|---|---|
| Polymer[a] | 150 | 150 |
| Calcium carbonate | 50 | 100 |
| Magnesium silicate | 50 | 0 |
| Naphthenic oil | 30 | 30 |
| Polystyrene | 30 | 20 |
| Titanium dioxide | 5 | 5 |
| Stearic acid | 3 | 3 |
| Stabilizer[b] | 0 | 1.0 |

[a]Polymer including 50 phr naphthenic oil.
[b]1/1 weight ratio of 2,2-methylenebis-(4-methyl-6-t-butylphenol) and di-lauryl thiodipropionate.

TABLE I

| RECIPE A: | | |
|---|---|---|
| Contact Time[a] | Run 1 (Inv.) Release Time[b] | Run 2 (Comp.) Release Time |
| 1 hr. | 0 | 0 |
| 4 hrs. | 0 | 0 |
| 24 hrs. | 0 | 0 |
| 7 days | 0 | 5 sec. |

| RECIPE B: | | |
|---|---|---|
| Contact Time[a] | Run 3 (Inv.) Release Time | Run 4 (Comp.) Release Time |
| 9 days | 0 | 5 sec. |
| 15 days | 0 | 15 sec. |
| 4 wks. | 0 | 40 sec. |
| 10 wks. | 0 | 30 sec. |

[a]Time that clamp was in closed position on tubing.
[b]Time for tubing to release or open following removal of clamp. 0 refers to immediate release.

The above data show that in inventive runs 1 and 3 the tubing treated with powdered milk solids did not stick closed, but opened immediately. Comparative runs 2 and 4 show that tubing clamped shut without the inventive treatment for a period of one week or longer remained closed for a period of time following removal of the clamp until the surfaces in contact released.

I claim:

1. Rubber tubing useful for the handling of food items coated on the interior surfaces thereof with sufficient powdered milk as an antitack agent to prevent sticking of the interior wall of said tubing on self contact where the amount of said powdered milk coating is in the range of about 0.1 mg to about 10 kg per square meter of surface area and said rubber tubing is free of residual solids prior to coating the rubber tubing with the powdered milk.

2. An article according to claim 1 wherein the rubber is synthetic rubber formed from polymerized acyclic conjugated diene compounds and monovinyl-substituted aromatic compounds.

3. An article according to claim 2 wherein said tubing is formed from radial teleblock copolymers of butadiene and styrene.

4. Elastomeric-containing flexible articles of manufacture useful for handling and storage of food items which possess sufficient inherent stickiness or tackiness to cause sticking upon self contact coated with sufficient powdered milk as an antitack agent to prevent sticking of said articles upon contact where the amount of said powdered milk coating is in the range of about 0.1 mg to about 10 kg per square meter of surface area and said elastomeric-containing flexible article of manufacture is free of residual solids prior to coating the article with the powdered milk.

5. An article according to claim 4 comprising natural or synthetic rubber-containing items useful for handling milk coated on the surfaces thereof with powdered milk to prevent sticking upon contact.

6. An article according to claim 5 comprising a rubber tube coated on at least a sufficient portion of the interior surfaces thereof with powdered milk to prevent sticking of the tube upon contact.

7. An article according to claim 6 wherein said tube is formed from polymerized conjugated diene and vinyl aromatic monomers and the interior of said tube is coated with sufficient powdered milk to provide a uniform coating over substantially the entire interior surface area of the tube.

8. An article according to claim 7 wherein said tubing is formed from polymerized butadiene and styrene.

9. An article according to claim 8 wherein the tubing is a compounded radial copolymer of butadiene and styrene.

10. A method for preventing elastomeric flexible articles of manufacture made for handling and storage of food items from sticking upon self contact which comprises coating said articles on the surfaces thereof with sufficient powdered milk as an antitack agent to prevent said articles from sticking upon contact with said coating being in the range of about 0.1 mg to 10 kg of powdered milk per square meter of surface area and said article being free of residual solids prior to the coating of the articles with the powdered milk.

11. A method for preventing rubber tubing useful for handling food items from sticking upon self contact which comprises coating the interior surfaces of said tubing with sufficient powdered milk to coat at least a portion of said tubing to prevent same from sticking upon contact with said coating being in the range of about 0.1 mg to about 10 kg of powdered milk per square meter of surface area.

12. A method according to claim 11 wherein the rubber is formed from polymerized acyclic conjugated diene and monovinyl aromatic monomers.

13. In a process for transporting milk through a rubber tubing free of residual solids including allowing milk to flow through said tubing and clamping said tubing thereby causing interior surfaces to come in contact whenever an interruption in the flow of milk is desired, the improvement comprising:

applying, prior to allowing milk to flow, a sufficient amount of powdered milk in the range from about 0.1 mg to about 10 kg per square meter of surface area onto the interior wall of the rubber tubing to prevent sticking of said interior wall to itself.

14. A process as claimed in claim 13 wherein the amount of powdered milk is sufficient to provide a uniform coating of the interior wall, but not more than the amount that readily adheres to the interior surface.

* * * * *